(12) United States Patent
Huang et al.

(10) Patent No.: US 8,754,847 B2
(45) Date of Patent: Jun. 17, 2014

(54) INTERACTIVE THREE-DIMENSIONAL DISPLAY SYSTEM AND METHOD OF CALCULATING DISTANCE

(75) Inventors: Yi-Pai Huang, Chiayi (TW); Pi-Cheng Wu, Taipei (TW); Guo-Zhen Wang, Taichung (TW); Cheng-Chiu Pai, Changhua County (TW)

(73) Assignee: Au Optronics Corporation, Hsinchu (TW)

( * ) Notice: Subject to any disclaimer, the term of this patent is extended or adjusted under 35 U.S.C. 154(b) by 942 days.

(21) Appl. No.: 12/832,989

(22) Filed: Jul. 9, 2010

(65) Prior Publication Data
US 2011/0227819 A1    Sep. 22, 2011

(30) Foreign Application Priority Data
Mar. 22, 2010  (TW) .............................. 99108357 A

(51) Int. Cl.
*G09G 5/00* (2006.01)
(52) U.S. Cl.
USPC ........... 345/156; 345/157; 345/158; 345/179; 345/180; 345/207; 345/419; 348/51
(58) Field of Classification Search
CPC ............................ G06F 3/042; G06F 3/0346
USPC ......... 345/156, 157, 175, 179, 180, 182, 207, 345/419, 158; 348/51; 178/18.09, 19.05
See application file for complete search history.

(56) References Cited

U.S. PATENT DOCUMENTS

| | | | |
|---|---|---|---|
| 5,640,273 A * | 6/1997 | Hamagishi et al. | 359/462 |
| 5,959,617 A * | 9/1999 | Bird et al. | 345/182 |
| 6,727,885 B1 * | 4/2004 | Ishino et al. | 345/156 |
| 7,499,027 B2 | 3/2009 | Brigham, II et al. | |
| 8,531,458 B2 * | 9/2013 | Huang et al. | 345/426 |
| 8,531,506 B2 * | 9/2013 | Wang et al. | 348/51 |
| 2005/0110781 A1 * | 5/2005 | Geaghan et al. | 345/180 |
| 2005/0195387 A1 * | 9/2005 | Zhang et al. | 356/138 |
| 2005/0237297 A1 * | 10/2005 | Holloway et al. | 345/157 |
| 2006/0152487 A1 * | 7/2006 | Grunnet-Jepsen et al. | 345/158 |
| 2006/0152489 A1 * | 7/2006 | Sweetser et al. | 345/158 |
| 2006/0244719 A1 * | 11/2006 | Brigham et al. | 345/156 |
| 2006/0284841 A1 * | 12/2006 | Hong et al. | 345/157 |
| 2007/0216644 A1 * | 9/2007 | Nam et al. | 345/158 |
| 2012/0229384 A1 * | 9/2012 | Nakane et al. | 345/158 |
| 2013/0155057 A1 * | 6/2013 | Wang et al. | 345/419 |
| 2013/0169596 A1 * | 7/2013 | Wang et al. | 345/175 |

OTHER PUBLICATIONS

"Office Action of Taiwan Counterpart Application", issued on Aug. 22, 2013, p. 1-p. 9.

* cited by examiner

*Primary Examiner* — Gregory J Tryder
*Assistant Examiner* — Peter D McLoone
(74) *Attorney, Agent, or Firm* — Jianq Chyun IP Office

(57) ABSTRACT

An interactive three-dimensional display system includes a three-dimensional display panel which has an optical sensor array, an interactive device which includes a projection light source and a shadow mask, and an image recognizing unit. The shadow mask has a pattern to define an image projected by the interactive device. The image is captured by the optical sensor array. The pattern includes two strip patterns which cross each other. The image includes two strip images which cross each other. The image recognizing unit is electrically connected with the optical sensor array and calculates relative positions of the interactive device and the three-dimensional display panel according to the image. A method of calculating the relative positions includes calculating according to the lengths of one of the strip patterns and one of the strip images, and a divergent angle and tilt angle of the projection light source.

13 Claims, 4 Drawing Sheets

INTERACTIVE THREE-DIMENSIONAL DISPLAY SYSTEM AND METHOD OF CALCULATING DISTANCE

CROSS-REFERENCE TO RELATED APPLICATION

This application claims the priority benefit of Taiwan application serial no. 99108357, filed on Mar. 22, 2010. The entirety of the above-mentioned patent application is hereby incorporated by reference herein and made a part of this specification.

BACKGROUND OF THE INVENTION

1. Field of the Invention

The invention is related to a three-dimensional (3D) display system, and in particular to an interactive three-dimensional display system.

2. Description of Related Art

In recent years, as display technology advances, users have become more and more demanding on display quality (such as image resolution and color saturation). However, besides high resolution and high color saturation, in order to satisfy the need of users to view realistic images, displays which are capable of displaying three-dimensional images have been developed. As current three-dimensional display technology continues to advance, it is foreseeable that real-time interaction between the user and three-dimensional images will become the trend in next generation human-machine interaction.

Currently, a three-dimensional interactive display device interacts with user by capturing the three-dimensional spatial position of the user. During actual operation, current interactive display devices sense signals input by the user, thereby tracking the positions of fingers by using a tracking device externally installed on the three-dimensional display. In conventional art, the relative positions of the tracking device and the three-dimensional display affect the sensing range of the tracking device, so that when the user clicks the three-dimensional image displayed by the three-dimensional display at some positions or click at an oblique angle, the tracking device is difficult to sense the signal input by the user; misjudgment may even occur, thereby reducing the interactive sensitivity. Moreover, the additionally installed tracking device also increases the volume of the three-dimensional display, thereby causing inconvenience in spatial arrangement.

SUMMARY OF THE INVENTION

The invention provides an interactive three-dimensional display system which has good interactive sensitivity.

The invention provides a method of calculating a distance, which is suitable for being used in an interactive three-dimensional display system to calculate the relative positions of an interactive device and a three-dimensional display panel.

The invention provides an interactive three-dimensional display system which includes a three-dimensional display panel, an interactive device, and an image recognizing unit. The three-dimensional display panel has an optical sensor array. The interactive device includes a projection light source and a shadow mask. The shadow mask has a pattern to define an image projected by the interactive device. The image is captured by the optical sensor array, wherein the pattern includes two strip patterns which cross each other, and the image includes two strip images which cross each other.

In addition, the image recognizing unit is electrically connected with the optical sensor array and calculates relative positions of the interactive device and the three-dimensional display panel according to the image captured by the in-cell type sensor array. The method of calculating the relative positions of the interactive device and the three-dimensional display panel includes calculating the relative positions of the interactive device and the three-dimensional display panel according to the length of one of the strip patterns, the length of one of the strip images, a divergent angle of the projection light source, and a tilt angle of the projection light source.

According to an embodiment of the invention, the pattern has two strip shading patterns which cross each other, and the strip shading patterns correspond to the strip images which cross each other.

According to an embodiment of the invention, the lengths of the strip shading patterns are substantially equal.

According to an embodiment of the invention, the strip shading patterns extend in directions which are substantially perpendicular to each other.

According to an embodiment of the invention, the pattern has two hollowed strip patterns which cross each other, and the hollowed strip patterns correspond to the strip images which cross each other.

According to an embodiment of the invention, the lengths of the hollowed strip patterns are substantially equal.

According to an embodiment of the invention, the hollowed strip patterns extend in directions which are substantially perpendicular to each other.

According to an embodiment of the invention, the projection light source includes a light emitting diode.

In addition, the invention further provides a method of calculating a distance which is suitable for calculating the shortest distance between an interactive device and an optical sensor array. The interactive device includes a projection light source and a shadow mask. The shadow mask has a pattern for defining an image projected by the interactive device, and the image is captured by the optical sensor array, wherein the pattern includes two strip patterns which cross each other, and the image includes two strip images which cross each other. The method of calculating the distance includes calculating the shortest distance between the interactive device and the optical sensor array according to the length of one of the strip patterns, the length of one the strip images, the divergent angle of the projection light source, and the tilt angle of the projection light source.

According to an embodiment of the invention, the length of each of the strip patterns is x, wherein the length of the longer one of the strip images is $W_L$, the divergent angle of the projection light source is $\psi$, the tilt angle of the projection light source is $\theta$, the shortest distance between the interactive device and the optical sensor array is h, and x, $W_L$, $\psi$, $\theta$, and h comply with the following equation:

$$W_L = \frac{h}{\tan(\psi - \theta)} + 2x\cos\theta$$

According to an embodiment of the invention, $0° \leq \theta \leq 40°$.

According to an embodiment of the invention, the length of each of the strip patterns is x, wherein the length of the shorter one of the strip images is $W_S$, the divergent angle of the projection light source is $\psi$, the tilt angle of the projection light source is $\theta$, the shortest distance between the interactive device and the optical sensor array is h, and x, $W_S$, $\psi$, $\theta$, and h comply with the following equation:

$$W_S = 2\times(h\sec\theta\times\cot\psi + x)$$

In summary, in embodiments of the invention, the optical sensor array is adopted and the strip patterns are designed on the interactive device, so that according to the changes of the lengths of the images corresponding to the tilt angle θ and the minimum distance h, the relative positions of the interactive device and the three-dimensional display panel are calculated, so that false actions caused by the user clicking the three-dimensional display panel at a tilt angle are prevented, thereby enhancing the interactive sensitivity of the interactive three-dimensional control display system.

In order to make the aforementioned and other objects, features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

First Embodiment

Figure 1:
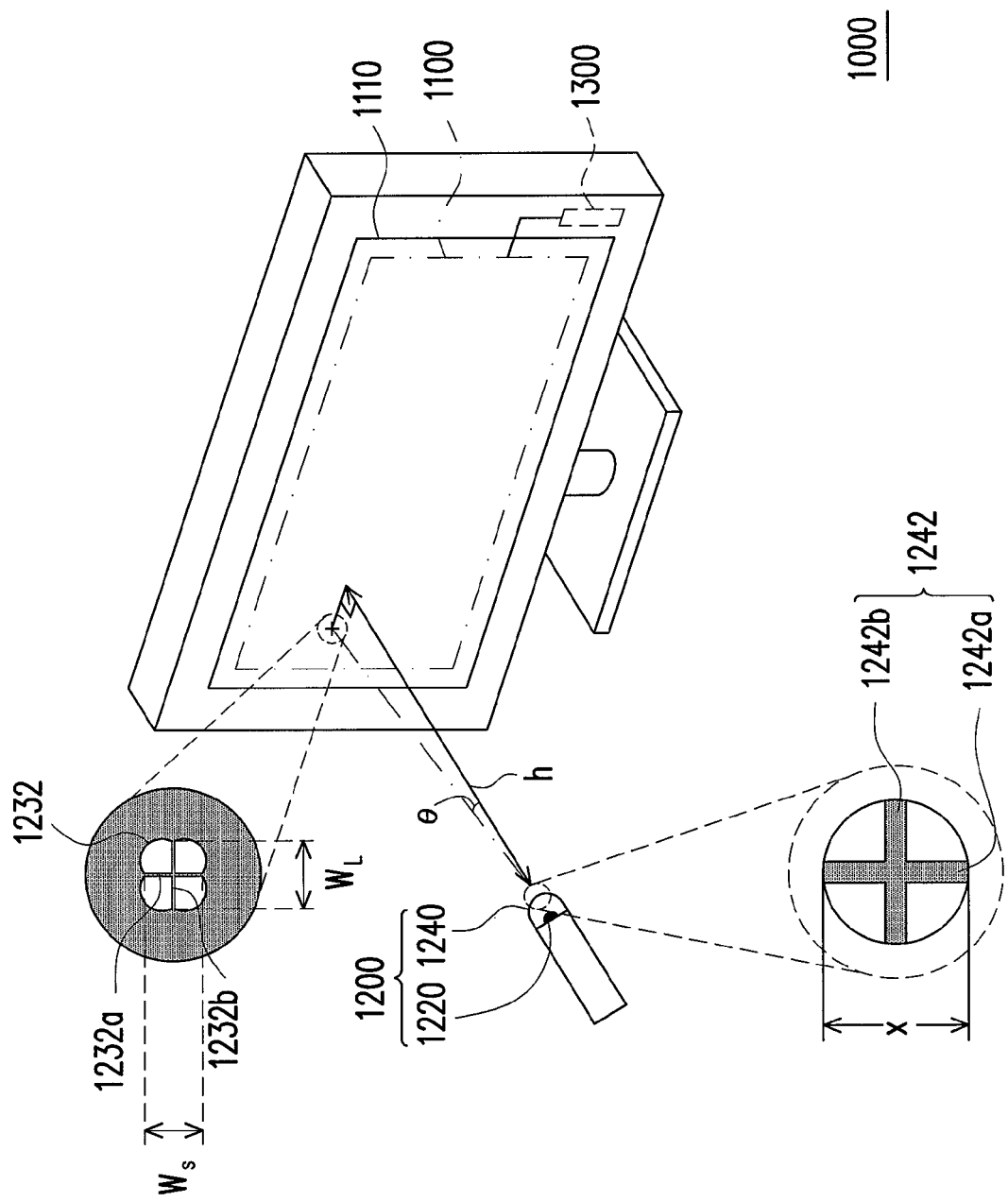
FIG. 1 is a schematic view of an interactive three-dimensional display system according to the first embodiment of the invention.

FIG. 1 is a schematic view of an interactive three-dimensional display system according to the first embodiment of the invention. Please refer to FIG. 1, an interactive three-dimensional display system 1000 includes a three-dimensional display panel 1100, an interactive device 1200, and an image recognizing unit 1300. The three-dimensional display panel 1100 includes an optical sensor array 1110, and the image recognizing unit 1300 is electrically connected with the optical sensor array 1110.

Still referring to FIG. 1, the interactive device 1200 includes a projection light source 1220 and a shadow mask 1240, wherein the projection light source 1220 includes a light emitting diode (LED) or another type of light source which has projective qualities. The shadow mask 1240 has a pattern 1242 to define an image 1232 projected by the interactive device 1200. The image 1232 is captured by the optical sensor array 1110. As shown in FIG. 1, the pattern 1242 includes two strip patterns 1242a and 1242b which cross each other, and the image 1232 includes two strip images 1232a and 1232b which cross each other.

In further detail, the strip patterns 1242a and 1242b are two strip shading patterns which cross each other, and the strip shading patterns 1242a and 1242b correspond to the strip images 1232a and 1232b which cross each other. The shading patterns 1242a and 1242b which cross each other are a dark area. In addition, a length x of the strip shading pattern 1242a and the length x of the strip shading pattern 1242b are substantially equal and extend in directions which are substantially perpendicular to each other. It should be noted that according to other embodiments, the lengths of the strip shading patterns 1242a and 1242b are not necessarily perpendicular to each other.

On the other hand, by using the optical sensor array 1110 to capture the above image 1232, the image recognizing unit 1300 is able to calculate the relative positions of the interactive device 1200 and the three-dimensional display panel 1100 according to the image 1232 captured by the optical sensor array 1110. According to the present embodiment, the image recognizing unit 1300 is capable of for example, calculating a shortest distance between the interactive device 1200 and the optical sensor array 1110. The method of calculating the relative positions of the interactive device 1200 and the three-dimensional display panel 1100 by the image recognizing unit 1300 includes calculating the relative positions of the interactive device 1200 and the three-dimensional display panel according to the length of the strip pattern 1242a or 1242b, a length $W_S$ or $W_L$ of the strip image 1232a or 1232b, a divergent angle $\psi$ of the projection light source 1220, and a tilt angle θ of the projection light source 120. Relevant calculation methods will be further described.

Figure 2:
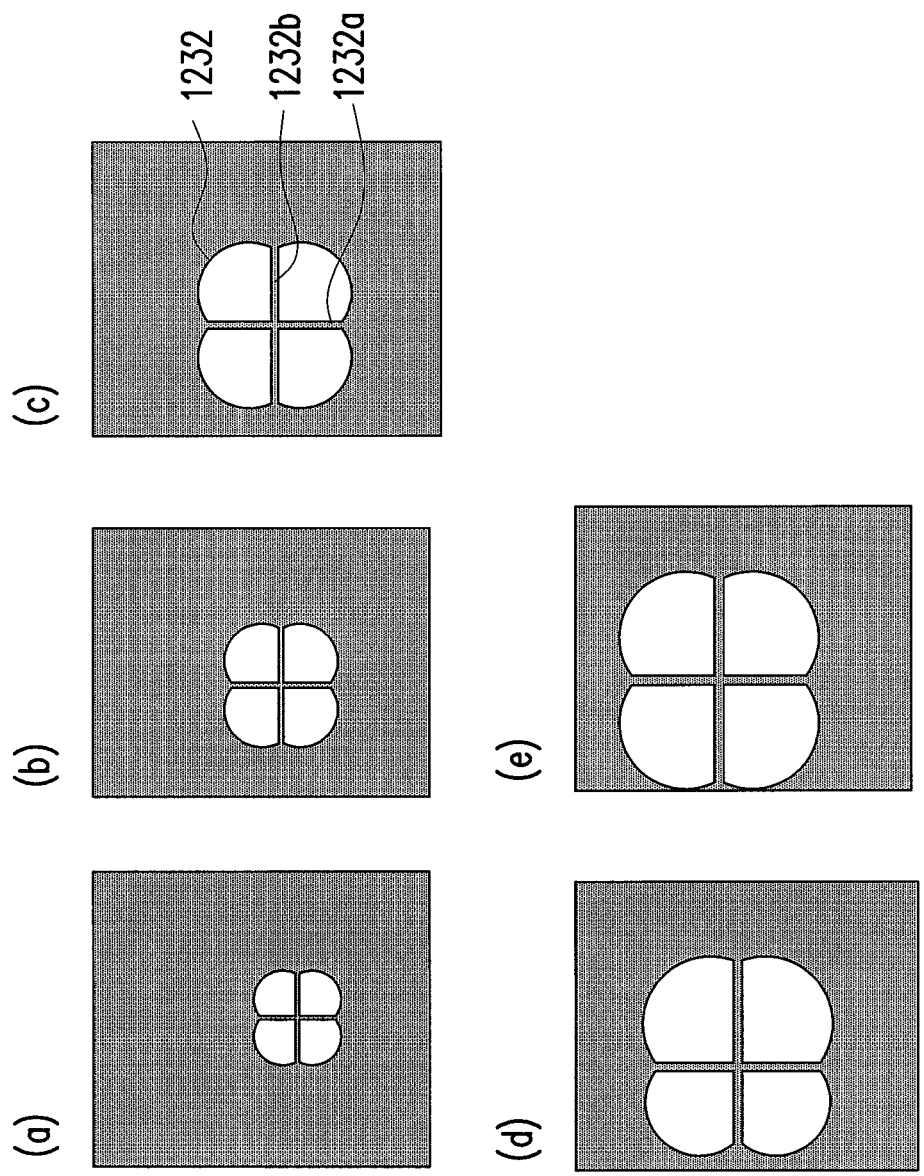
FIG. 2 includes schematic projection views of an image on a three-dimensional display panel.

FIG. 2 includes schematic views of the projection of the image 1232 on the three-dimensional display panel 1100, wherein sub-figures (a) to (e) correspond to the interactive device 1200 at different positions and having different tilt angles θ. In detail, in sub-figures (a) to (e), when the interactive device 1200 corresponds to sub-figure (a), the interactive device 1200 is closest to the three-dimensional display panel 1100, and when the interactive device 1200 corresponds to sub-figure (e), the interactive device 1200 is farthest from the three-dimensional display panel 1100. Moreover, since the projection light source 1220 of the interactive device 1200 does not perpendicularly emit light towards the three-dimensional display panel 1100, the strip patterns 1242a and 1242b which have the same length x corresponds to the strip images 1232a and 1232b which have different lengths.

As shown in FIG. 2, since the projection light source 1220 emits light obliquely, in sub-figures (a) to (e), the length of the strip image 1232b is greater than the length of the strip image 1232a. It is known from the above that the lengths of the strip images 1232a and 1232b are affected by the distance between the interactive device 1200 and the three-dimensional display panel 1100 and by the tilt angle θ of the interactive device 1200. Hence, by sensing the lengths of the strip patterns 1242a and 1242b, the distance between the interactive device 1200 and the optical sensor array 1110 is reversely deduced. In other words, the relative positions of the interactive device 1200 and the optical sensor array 1110 are reversely deduced.

For convenience of further description, the length of the longer strip image 1232b is defined as $W_L$, and the length of the shorter strip image 1232a is defined as $W_S$. In addition, the shortest distance between the interactive device 1200 and the optical sensor array 1110 is defined as h. According to the present embodiment, $0° \leq \theta \leq 40°$, and the set of x, $W_L$, $\psi$, θ, and h and the set of x, $W_S$, $\psi$, θ, and h respectively complies with the following equations.

$$W_L = \frac{h}{\tan(\psi - \theta)} + 2x\cos\theta$$

$$W_S = 2 \times (h\sec\theta \times \cot\psi + x)$$

As known from the above equations, the lengths $W_L$ and $W_S$ of the strip images 1232a and 1232b change with the tilt angle θ and the distance h in a linear fashion. Hence, the recognizing unit 1300 in FIG. 1 is able to calculate the shortest distance h between the interactive device 1200 and the optical sensor array 1110 according to the length x of one of the strip patterns, the length $W_L$ or $W_S$ of the strip images, the divergent angle ψ of the projection light source, and the tilt angle θ of the projection light source.

Figure 3:
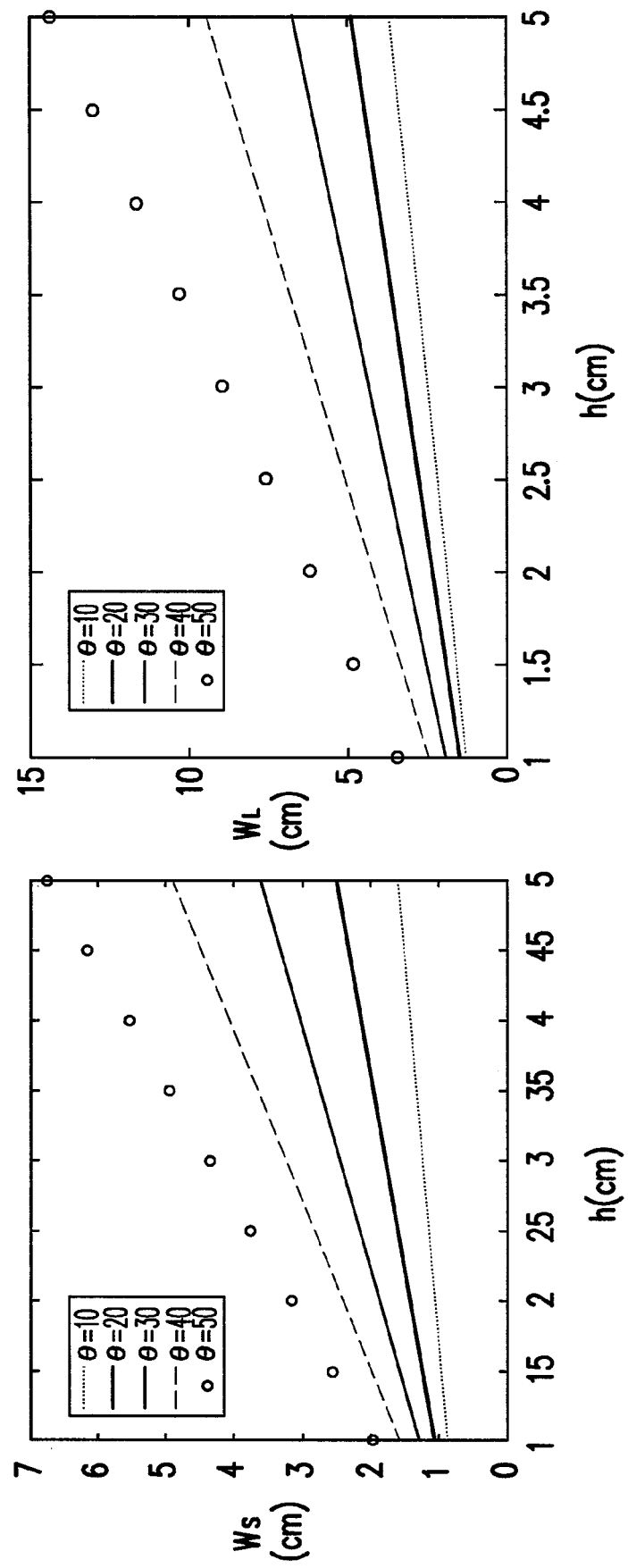
FIG. 3 includes stimulated diagrams of the relationship between a height of strip patterns and a distance h.

FIG. 3 includes stimulated diagrams of the relationship between the height of strip images and the distance h. The left part of FIG. 3 is a relationship diagram between the length $W_L$ and the distance h as the tilt angle θ varies, and the right part of FIG. 3 is a relationship diagram between the length $W_S$ and the distance h as the tilt angle θ varies. As shown in FIG. 3, the changes in the lengths $W_L$ and $W_S$ as the tilt angle varies may be viewed as linear changes, so that the image recognizing unit 1300 deduces the distance h according to the lengths $W_L$ or $W_S$. In addition, since when the image recognition unit 1300 calculates the distance h, the tilt angle θ has been factored in, conventional false actions due to clicking at a tilted angle do not occur, so that interactive sensitivity of the interactive three-dimensional display system 1000 is enhanced. In addition, by using the in-cell type optical sensor array 1110, additional volume for the installation of a tracking device on the three-dimensional display device is eliminated. Moreover, since the interactive device 1200 according to the present embodiment is easy to manufacture, the manufacturing cost of the interactive three-dimensional display system is reduced.

Second Embodiment

Figure 4:
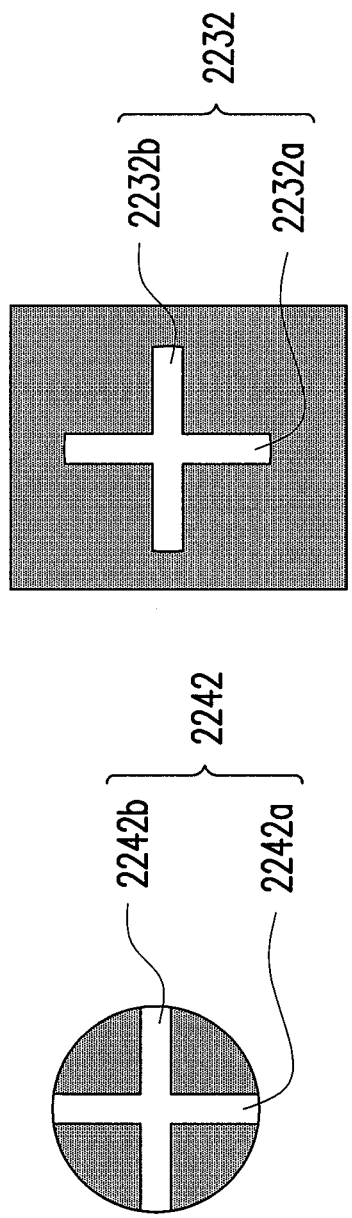
FIG. 4 includes schematic views of a pattern and an image according to the second embodiment of the invention.

FIG. 4 includes schematic views of a pattern and an image according to the second embodiment of the invention. A pattern 2242 in FIG. 4 is similar to the pattern 1242 in FIG. 1. The main difference in between is that the pattern 2242 has two hollowed strip regions 2242a and 2242b which cross each other, and the hollowed strip regions 2242a and 2242b correspond to strip images 2232a and 2232b which cross each other.

In addition, the length of the hollowed strip pattern 2242a and the length of the hollowed strip pattern 2242b are substantially equal and extend in directions which are substantially perpendicular to each other. The above pattern 2242 defines an image 2232 projected by the interactive device, wherein the strip images 2232a and 2232b are a bright area. It should be noted that according to other embodiments, the lengths of the hollowed strip patterns 2242a and 2242b are not necessarily perpendicular to each other.

Please refer to both FIGS. 1 and 4. Similar to the first embodiment, the image 2232 is captured by the optical sensor array 1110, so that the image recognizing unit 1300 is able to calculate the relative positions of the interactive device 1200 and the three-dimensional display panel 1100 according to the image 2232 captured by the optical sensor array 1110.

In summary, in embodiments of the invention, the optical sensor array is adopted and the strip patterns are designed on the interactive device, so that according to the changes of the lengths of the images corresponding to the tilt angle θ and the minimum distance h, the relative positions of the interactive device and the three-dimensional display panel are calculated, so that false actions caused by the user clicking the three-dimensional display panel at a tilt angle are prevented, thereby enhancing the interactive sensitivity of the interactive three-dimensional control display system.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An interactive three-dimensional (3D) display system, comprising:
   a three-dimensional display panel having an optical sensor array;
   an interactive device comprising a projection light source and a shadow mask, wherein the shadow mask has a pattern which defines an image projected by the interactive device, the image being captured by the optical sensor array, the pattern comprising two strip patterns which cross each other, and the image comprising two strip images which cross each other; and
   an image recognizing unit electrically connected with the optical sensor array, wherein the image recognizing unit calculates relative positions of the interactive device and the three-dimensional display panel according to the image captured by the optical sensor array, a method of calculating the relative positions of the interactive device and the three-dimensional display panel comprises: calculating the relative positions of the interactive device and the three-dimensional display panel according to a length of one of the strip patterns, a length of only one of the strip images, a divergent angle of the projection light source, and a tilt angle of the projection light source.

2. The interactive three-dimensional display system as claimed in claim 1, wherein the pattern has two strip shading patterns which cross each other, and the strip shading patterns correspond to the strip images which cross each other.

3. The interactive three-dimensional display system as claimed in claim 2, wherein lengths of the strip shading patterns are substantially equal.

4. The interactive three-dimensional display system as claimed in claim 2, wherein the strip shading patterns extend in directions which are substantially perpendicular to each other.

5. The interactive three-dimensional display system as claimed in claim 1, wherein the pattern has two hollowed strip patterns which cross each other, and the hollowed strip patterns correspond to the strip images which cross each other.

6. The interactive three-dimensional display system as claimed in claim 5, wherein lengths of the hollowed strip patterns are substantially equal.

7. The interactive three-dimensional display system as claimed in claim 5, wherein the hollowed strip patterns extend in directions which are substantially perpendicular to each other.

8. The interactive three-dimensional display system as claimed in claim 1, wherein the projection light source comprises a light emitting diode.

9. A method of calculating a distance, suitable for calculating a shortest distance between an interactive device and an optical sensor array, wherein the interactive device comprises a projection light source and a shadow mask, the shadow mask has a pattern which defines an image projected by the interactive device, the image is captured by the optical sensor array, the pattern comprises two strip patterns which cross each other, and the image comprises two strip images which cross each other, the method of calculating the distance comprising:
   calculating the shortest distance between the interactive device and the optical sensor array according to a length of one of the strip patterns, a length of only one of the strip images, a divergent angle of the projection light source, and a tilt angle of the projection light source.

10. The method of calculating the distance as claimed in claim 9, wherein a length of each of the strip patterns is , the length of the longer one of the strip images is $W_L$, the divergent angle of the projection light source is $\psi$, the tilt angle of the projection light source is $\theta$, the shortest distance between the interactive device and the optical sensor array is h, and x, $W_L$, $\psi$, $\theta$, and h comply with a following equation:

$$W_L = \frac{h}{\tan(\psi - \theta)} + 2x\cos\theta.$$

11. The method of calculating the distance as claimed in claim 10, wherein $0° \leq \theta \leq 40°$.

12. The method of calculating the distance as claimed in claim 9, wherein a length of each of the strip patterns is x, the length of the shorter one of the strip images is $W_s$, the divergent angle of the projection light source is $\psi$, the tilt angle of the projection light source is $\theta$, the shortest distance between the interactive device and the optical sensor array is h, and x, $W_S$, $\psi$, $\theta$, and h comply with a following equation:

$$W_S = 2 \times (h\sec\theta \times \cot\psi + x).$$

13. The method of calculating the distance as claimed in claim 12, wherein $0° \leq \theta \leq 40°$.

* * * * *